Figure 1:
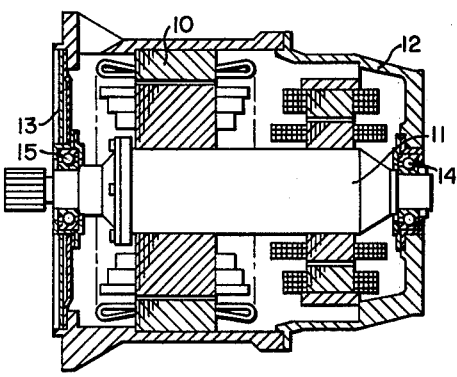

May 11, 1965 — L. D. CREEGER ETAL — 3,183,043
FAIL-SAFE BEARING STRUCTURE
Filed Oct. 18, 1962

WITNESSES
John G. Chopp
James F. Young

INVENTORS
Larry D. Creeger
William S. Neff
BY
Francis E. Blake
ATTORNEY

United States Patent Office 3,183,043
Patented May 11, 1965

3,183,043
FAIL-SAFE BEARING STRUCTURE
Larry D. Creeger, Jackson Township, Allen County, and William S. Neff, Fort Shawnee, Ohio, assignors to Westinghouse Electric Corporation, Pittsburgh, Pa., a corporation of Pennsylvania
Filed Oct. 18, 1962, Ser. No. 231,478
3 Claims. (Cl. 308—1)

The present invention relates to bearing structures, and more particularly to fail-safe bearing arrangements having bearing surfaces that may continue to function under emergency conditions after indication of essential failure of the main bearing assembly.

There are many machine elements and mechanisms having rotating parts that must continue to rotate under emergency conditions if a major crisis is to be avoided. For example, aircraft have numerous rotating parts such as generators or motors whose continued operation may be vital to the safety of the aircraft even if a bearing failure has occurred. Of course it is also desirable to provide an indication of the bearing failure after it occurs in order that the continued operation under emergency conditions may be for as short a time as possible and in order that the bearing failure may be corrected.

It is a principal object of the present invention to provide an improved fail-safe bearing arrangement that may continue to function under emergency conditions after failure of the main bearing structure.

Yet another object of the invention is to provide an improved safety bearing arrangement that will indicate a failure of the main bearing structure when emergency conditions arise under continued operation of the bearing.

A feature of the invention is the provision of first and second bearing surfaces on the rotor of the generator or the like with a first bearing which may be an anti-friction bearing normally engaging the stator and the first rotor bearing surface. In addition, a stator bearing surface is provided which normally does not engage the second rotor bearing surface, while the first or anti-friction bearing is functioning properly, and which engages the second bearing surface in journal bearing relationship upon failure of the first or anti-friction bearing. The journal bearing engagement of the stator bearing surface with the second rotor bearing surface enables continued operation of the rotor under emergency conditions, and an accompanying rise in temperature of the stator bearing surface causes the operation of temperature sensing means associated therewith to signal the failure of the first or anti-friction bearing. In accordance with the invention, the temperature sensing means is responsive to the rise in temperature to complete an electrical circuit which will be maintained thereafter without the use of relays or other complicated circuit arrangements. Thus if the bearing should be temporarily not used after failure, the indication of previous bearing failure will continue regardless of the temperature of the bearing.

Figure 2:
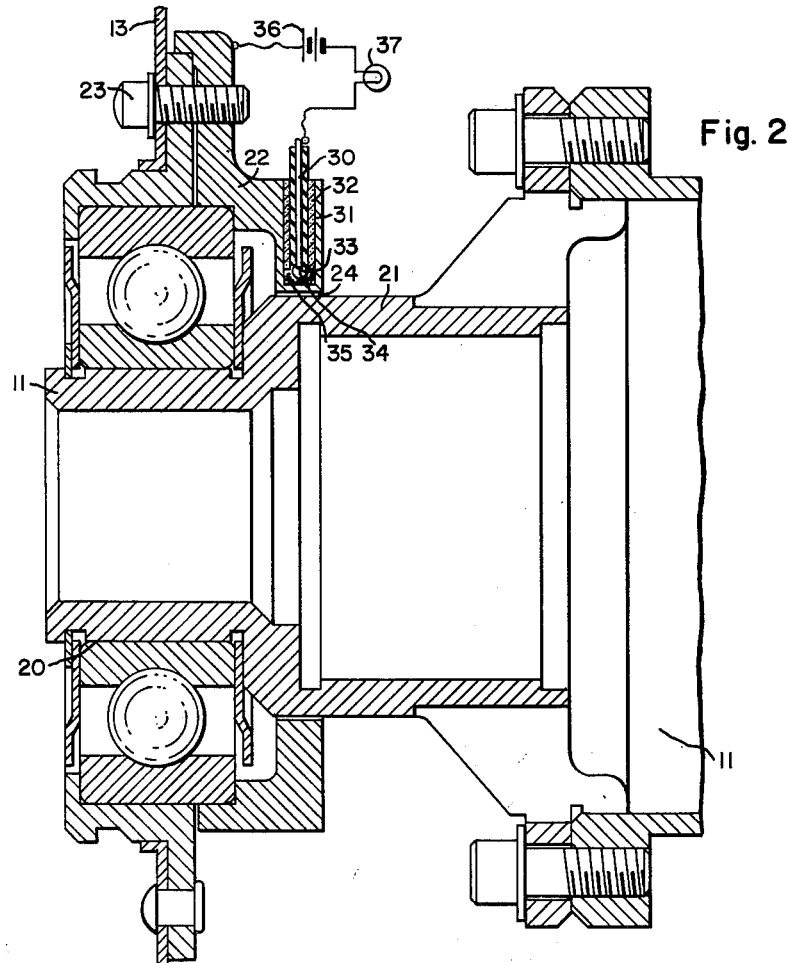

Further objects, features and the attending advantages of the invention will be apparent with reference to the following specification and drawings, in which:

FIGURE 1 is a simplified sectional view of typical apparatus embodying the bearing arrangement of the invention; and FIGURE 2 is an enlarged sectional view of one of the bearing structures shown in FIGURE 1 of the drawing and showing in detail the fail-safe bearing arrangement of the invention.

Although the bearing arrangement of the invention will be described in connection with its use in an aircraft generator structure, it should be understood that the bearing arrangement of the invention may be used with any apparatus having rotating parts to be journalled in a stator structure. FIGURE 1 of the drawing shows a typical generator structure as it may be designed for aircraft use and it will be seen that the structure includes a stator 10, a rotor 11, an end bracket 12 and an end closure and bearing diaphragm 13. Anti-friction bearing arrangements are provided such as a ball bearing 14 at one end of the rotor shaft 11 together with the anti-friction ball bearing arrangement 15 at the other end of the rotor shaft. Either one or both of the anti-friction bearings 14, 15 may be provided with the arrangement of the invention. For purposes of the present description the arrangement of the ball bearing 15 has been shown in an enlarged sectional detail in FIGURE 2 of the drawing and includes the novel bearing fail-safe arrangement of the invention.

Referring now to FIGURE 2 of the drawing it will be seen that the rotor shaft 11 is provided with a first bearing surface 20 and a second bearing surface 21 which are axially spaced with relation to each other. The anti-friction bearing such as the ball bearing 15 is mounted between the stator diaphragm 13 and the first bearing surface 20 of the rotor shaft 11 to support the shaft for rotation. The stator diaphragm 13 is also provided with a stationary cylindrical or journal bearing surface on a bearing member 22 secured thereto by means of bolts such as the bolt 23. It will be seen that the journal bearing member 22 is dimensioned to normally provide a limited clearance space 24 around the second rotor bearing surface 21 so as not to normally engage such bearing surface. However, the dimensions of the related bearing surfaces 21 and 22 are such that, should the main anti-friction bearing 15 fail, the second bearing surface 21 of the rotor 11 will engage the stator bearing member 22 to be thereby journaled in bearing relation. Thus, the rotor 11 may continue to rotate under emergency conditions of operation even after failure of the first anti-friction bearing structure 15.

It should now be obvious that since the bearing surfaces 21 and 22 are of a journal bearing configuration, there will be an accompanying rise in temperature of the bearing surface 22 of the stator when such bearing surfaces are engaged upon failure of the main bearing 15. Even though lubrication facilities (not shown) may be provided for the bearing surfaces 21 and 22, there will be an accompanying rise in temperature for the bearing member 22 when the gap 24 is closed upon engagement of the bearing surfaces 21 and 22 as mentioned above. In accordance with the invention, a temperature sensing element is provided on the stator bearing member 22 to indicate its rise in temperature and thus indicate the failure of the main bearing 15. This temperature sensing element may take various forms but in accordance with the invention, a presently preferred arrangement is shown to be the provision of an insulated electrical conductor 30 extending into the aperture 31 of the bearing structure 22. It is pointed out that the stator bearing 22 is constructed of metal or some other electrically conductive material. The insulated wire 30 is positioned in the aperture 31 by means of electrically insulating potting compound 32 and the exposed end 33 of the conductor 30 is surrounded by a globule of insulating material such as wax with a low melting temperature range. Surrounding the globule of wax 34 is an amount of normally solid metal such as solder 35 that is selected to have a melting temperature corresponding to the desired temperature of the bearing member 22 to be indicative of a failure of the main bearing 15. The operation of the temperature sensing arrangement should now be understood. Upon rise of the temperature of the stator bearing 22 above a predetermined point indicative of engagement of the bearing surfaces 21 and 22, the solder 35 and the wax 34 will melt. The wax will float to the surface of the solder so that electrical contact is established and maintained between the end 33 of the electrical conductor 30 through the solder 35 to the metal bearing structure 22, and thereby a circuit is established and maintained without use of additional relays between the bearing structure 22, a battery or other current source 36, indicator light 37, conductor 30, and the solder composition 35 to light the indicator light 37 and indicate operation of the bearing surfaces 21 and 22 upon failure of the main anti-friction bearing 15. If the use of the bearing is temporarily interrupted to lower its temperature, the solidified solder will still establish electrical contact to maintain the failure indication and thus warn against a further use of the bearing structure.

Various modifications will occur to those skilled in the art. For example, any suitable bearing may be substituted for the ball bearing 15 without departing from the spirit of the invention.

Also, any form of electric signal means may be used in place of the electric signal light as specifically described.

We claim as our invention:

1. A fail-safe bearing structure for rotating machinery comprising, a stator, a rotor shaft having first and second rotor bearing surfaces, a first stator bearing between said stator and said first bearing surface, a second stator bearing carried by said stator to normally not engage said second rotor bearing surface and adapted to engage said second rotor bearing surface to thereby journal said rotor upon failure of said first bearing, temperature responsive indicating means carried by said second stator bearing and responsive to temperature rise of said second stator bearing upon engagement with said second rotor bearing surface to indicate failure of said first stator bearing, said second stator bearing being comprised of electrically conductive material, said temperature responsive indicating means being comprised of an electric conductor adapted to be connected in series with electric signal means to one terminal of a source of electric current, means to mount said conductor in normally electric insulating relation on said second stator bearing, means adapted to electrically connect said second stator bearing to the other terminal of the source of electric current, and temperature responsive means to change said mounting means to irreversibly electrically connect said conductor to said second stator bearing upon rise in temperature of the second stator bearing above a predetermined amount.

2. A fail-safe bearing structure for rotating machinery comprising, a stator, a rotor shaft having first and second axially spaced rotor bearing surfaces, a ball bearing interposed between said stator and said first bearing surface, a journal bearing carried by said stator and dimensioned to normally not engage said second rotor bearing surface but to engage said second rotor bearing surface to thereby journal said rotor upon failure of said ball bearing, temperature responsive indicating means carried by said journal bearing and responsive to temperature rise of said journal bearing upon engagement with said second rotor bearing surface to indicate failure of said ball bearing, said journal bearing being comprised of electrically conductive material, said temperature responsive indicating means being comprised of an electric conductor adapted to be connected in series with electric signal means to one terminal of a source of electric current, means to mount said conductor in normally electric insulating relation on said journal bearing, means adapted to electrically connect said journal bearing to the other terminal of the source of electric current, and temperature responsive means to change said mounting means to irreversibly electrically connect said conductor to said journal bearing upon rise in temperature of the journal bearing above a predetermined amount.

3. A fail-safe bearing structure for rotating machinery comprising, a stator, a rotor shaft having first and second axially spaced rotor bearing surfaces, a ball bearing interposed between said stator and said first bearing surface, a journal bearing carried by said stator and dimensioned to normally not engage said second rotor bearing surface but to engage said second rotor bearing surface to thereby journal said rotor upon failure of said ball bearing, temperature responsive indicating means carried by said journal bearing and responsive to temperature rise of said journal bearing upon engagement with said second rotor bearing surface to indicate failure of said ball bearing, said journal bearing being comprised of electrically conductive material, said temperature responsive indicating means being comprised of an electric conductor normally mounted in electrically insulating relation on said journal bearing, and normally solid temperature responsive electrically conductive contact means carried by said journal bearing and adapted to be melted to flow between said conductor and said journal bearing to establish and maintain electrical contact between said journal bearing and conductor after the temperature of said journal bearing has risen above a predetermined amount.

References Cited by the Examiner

UNITED STATES PATENTS

| | | | |
|---|---|---|---|
| 1,018,253 | 2/12 | McWilliams | 184—1 |
| 1,512,456 | 10/24 | Carman. | |
| 2,464,340 | 3/49 | Newbill | 200—142 |
| 2,490,784 | 12/49 | Davenport | 308—35 |

FOREIGN PATENTS 88,470 11/21 Austria.

FRANK SUSKO, *Primary Examiner.*

ROBERT C. RIORDON, *Examiner.*